United States Patent [19]

Sakakibara et al.

[11] Patent Number: 4,608,958
[45] Date of Patent: Sep. 2, 1986

[54] LOAD REACTANCE ELEMENT DRIVING DEVICE

[75] Inventors: Yasuyuki Sakakibara, Nishio; Norihito Tokura, Aichi, both of Japan

[73] Assignee: Nippon Soken, Inc., Nishio, Japan

[21] Appl. No.: 533,812

[22] Filed: Sep. 19, 1983

[30] Foreign Application Priority Data

Sep. 22, 1982 [JP] Japan ............................ 57-164010
May 30, 1983 [JP] Japan ............................ 58-94020

[51] Int. Cl.$^4$ ............................................. F02P 3/08
[52] U.S. Cl. .................................... 123/605; 123/606; 123/498; 315/209 CD; 315/209 SC; 318/696
[58] Field of Search ............... 123/598, 596, 605, 606, 123/637; 315/209 CD, 209 SC

[56] References Cited

U.S. PATENT DOCUMENTS

| 3,489,129 | 1/1970 | Issler et al. | 123/598 |
| 3,842,816 | 10/1974 | Vargas | 123/598 |
| 4,149,508 | 4/1979 | Kirk, Jr. et al. | 123/598 |

*Primary Examiner*—Andrew M. Dolinar
*Attorney, Agent, or Firm*—Cushman, Darby & Cushman

[57] ABSTRACT

A device for driving a load reactance element, such as a piezoelectric actuator for a fuel injection system, including a series reactance element connected in series with the load reactance element, and a resonance circuit formed by the load reactance and the series reactance. First and second switching elements are connected between the resonance circuit and the power source or ground potential. Each of the first and second switching elements is rendered conductive only during a half cycle of resonance. The directions of the load current flowing through the load reactance element are switchable by making alternately the first and second switching elements conductive.

2 Claims, 18 Drawing Figures

LOAD REACTANCE ELEMENT DRIVING DEVICE

BACKGROUND OF THE INVENTION

1. Field of the Invention

The present invention relates to a device for energizing a reactance element as a load. The reactance element may be a capacitance element or an inductance element. The device of the present invention is used, for example, for controlling an actuator of a fuel injection nozzle of an internal combustion engine for an automobile.

2. Description of the Prior Art

In a prior art method for energizing a load reactance element by positive or negative voltage, a positive and a negative power source are provided and connected through switches to the load reactance element. By carrying out an ON/OFF operation of the switches at a predetermined timing, the desired energization of the load reactance element is carried out.

In another method for energizing a load reactance element by positive or negative voltage, first through fourth switches are connected to form a bridge circuit, a power source is connected diagonally between one pair of nodes of the bridge circuit, and a load reactance element is connected diagonally between the other pair of nodes of the bridge circuit. By carrying out an ON/OFF operation of the first through fourth switches, the desired energization of the load reactance element is carried out.

These prior art methods, however, have the disadvantages of an increased number of DC power sources or switches, relatively complicated operation of the device, and a relatively expensive price.

SUMMARY OF THE INVENTION

It is the object of the present invention to provide an improved device for energizing a reactance element as a load, in which the energization of the reactance element in the positive or the negative direction can be carried out correctly by a device of relatively simple structure using a single power source.

In accordance with a fundamental aspect of the present invention, there is provided a device for driving a load reactance element comprising: a power source; a series reactance element connected in series with the load reactance element; a resonance circuit being formed by the load reactance and the series reactance, a first switching element connected between the resonance circuit and the power source; and a second switching element connected between the resonance circuit and ground potential. The first and second switching elements are rendered conductive only during a half cycle of resonance. The directions of the load current flowing through the load reactance element are switchable by making alternately the first and second switching elements conductive.

DESCRIPTION OF THE PREFERRED EMBODIMENTS

Figure 1:
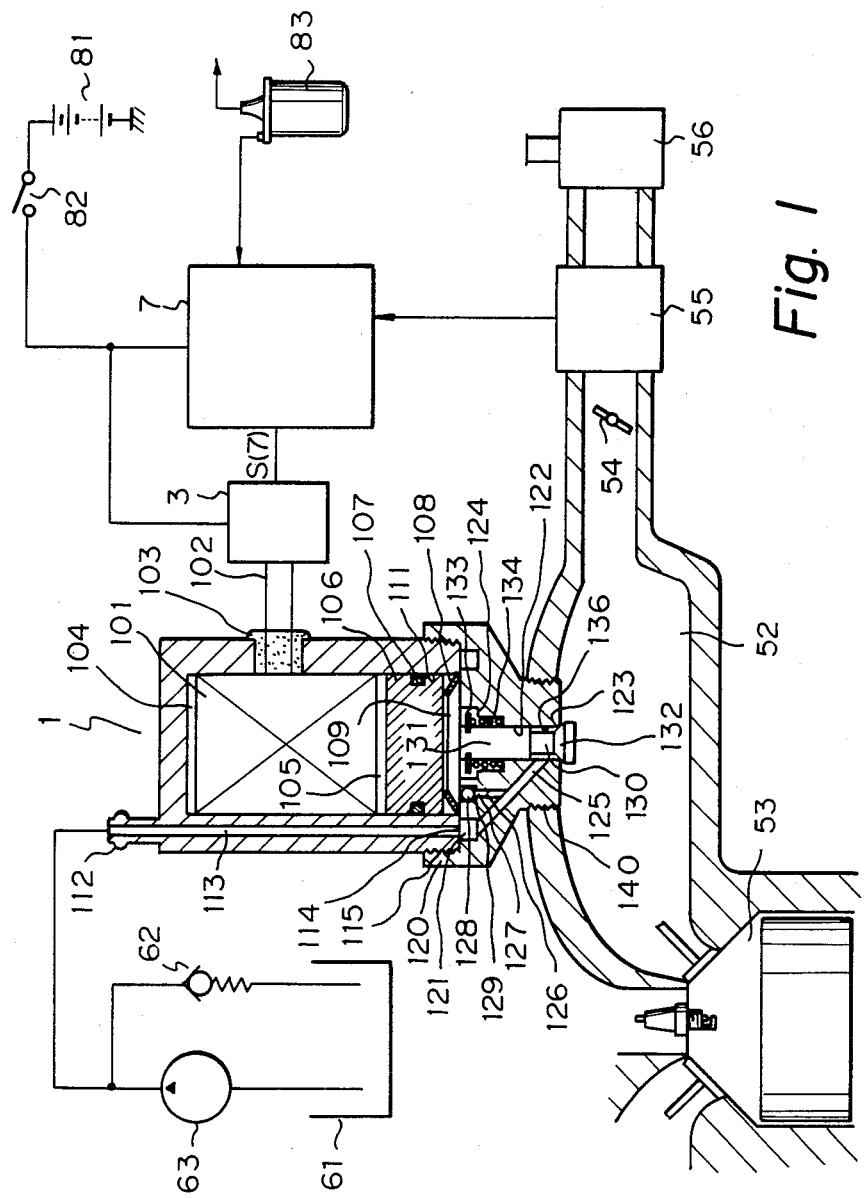
FIG. 1 illustrates a device for energizing a reactance element as a load according to an embodiment of the present invention.

A device for energizing a reactance element as a load according to an embodiment of the present invention is illustrated in FIG. 1. In the device of FIG. 1, the load reactance element is a capacitance element in the form of a piezoelectric actuator. The piezoelectric actuator is used for controlling a fuel injection nozzle device 1 for an engine.

In the fuel injection nozzle device 1, a piezoelectric actuator 101 is accommodated in a housing 110. The piezoelectric actuator 101 is formed by laminating PZT discs of a diameter of 15 mm and thickness of 0.5 mm. When +500 V is applied to the piezoelectric actuator 101, the piezoelectric actuator 101 is extended longitudinally by 50 μm. When −200 V is then applied, the piezoelectric actuator 101 shrinks back to its original length.

A lead wire 102 runs between the piezoelectric actuator 101 and a driving circuit 3 through a grommet 103 to transmit signals from the driving circuit 3. Insulators 104 and 105 are provided for electrical insulation on the piezoelectric actuator 101.

A piston 106 is provided oil tightly in the cylinder portion 111 of the housing 110. An O-ring 107 is provided in the intermediate position of the piston 106. A Belleville spring 108 exerts a pressure upward to the piston 106, the insulators 104 and 105, and the piezoelectric actuator 101. An inlet port 112 is provided in the housing 110 for supplying fuel from outside. At the bottom 114 of a passage 113 provided in the side portion of the housing 110, an outlet of the passage 113 is provided.

A valve body 120 is coupled to the housing 110 by a screw structure 115. A ring-shaped passage 121 provided in the valve body 120 is communicated with the passage 113 in the housing 110. At the center of the valve body 120 there is provided a cylindrical portion 122 with which a valve 130 is combined. A piston portion 131 of the valve 130 is inserted into the cylindrical portion 122. The lower end of the valve 130 is a poppet-type external-opening valve structure. The seal is formed by contact between a valve seat portion 123 of the valve body 120 and a poppet structure 132 of the piston portion 131. A stopper 133 is provided at the upper portion of the valve 130. The valve 130 is pushed upward by a spring 134 so that the closing of the valve is carried out. The valve body 120 has a step 124 to which the stopper 133 of the valve 130 abuts when the valve 130 moves downward so that the stroke of the valve 130 is maintained constant. Fuel is filled in an oil reservoir 136, which is communicated with the ring-shaped passage 121 through a passage 125.

The passage 125 is communicated with a pumping chamber 109 through a passage 127 having an orifice 126 and a check valve 129 having a ball 128.

The fuel injection nozzle device 1 is fixed to an air intake manifold 52 by a screw portion 140 of the valve body 120. The downstream portion of the air intake manifold 52 is connected to a combustion chamber 53. The upstream portion of the air intake manifold 52 is connected through a throttle mechanism 54 to an air flow measurement mechanism 55 and an air cleaner 56. For example, a known beated-wire-type air flow speedometer, which generates a voltage proportional to the air flow, is used for the air flow measurement mechanism 55.

A control circuit 7 which is almost the same as control circuits used in prior art electronic fuel injection systems is used. The signal from the air flow measurement mechanism 55 and the signal representing the engine rotational speed from the negative polarity terminal of the primary winding of an ignition coil 83 driven by an ignitor (not shown) are supplied to the control circuit 7. Although not shown in the drawings, it is also possible to supply signals from a water temperature sensor, an intake air temperature sensor, an $O_2$ sensor, or the like.

The control circuit 7 calculates the required amount of fuel based on the intake air amount from the air flow measurement mechanism 55 and the engine rotational speed and, if necessary, carries out the subsequent correction on the calculated required amount of fuel. It then supplies the obtained pulse signal to the driving circuit 3 in synchronization with the engine rotation. The pulse width of the obtained pulse signal corresponds to the amount of fuel.

Voltage signals of +500 V and −200 V converted by the driving circuit 3, to which the driving signal S(7) is supplied from the control circuit 7, are supplied to the piezoelectric actuator 101. Details of the driving circuit 3 will be described later.

The operation of the fuel injection nozzle device 1 of FIG. 1 will now be explained. Fuel is transported under a pressure of approximately 3 kg/cm² from a fuel tank 61 by a feed pump 63. The fuel is supplied through the inlet port 112 to the fuel injection nozzle device 1. The supplied fuel is transported through the passage 113, the ring-shaped passage 121, and the passage 125 to fill the oil reservoir 136.

When a −200 V signal is supplied to the piezoelectric actuator 101, the piezoelectric actuator 101 is in the shrunken state. Hence, the pressure in the pumping chamber 109 is approximately the same as the feed pressure. The forces acting on the valve 130 due to the pressure of the oil reservoir 136 are balanced. Hence, the force given by the pressure in the pumping chamber 109 and the area of the cross-section of the valve 130 acts downward on the valve 130. However, the force of the spring 134 is selected to be greater than the downward force. Accordingly, the valve 130 remains pushed upward. Thus, the poppet portion 132 is pressed on the valve seat 123. Accordingly, no fuel injection takes place.

When a +500 V signal is supplied to the piezoelectric actuator 101, the piezoelectric actuator 101 is forced to be extended by, for example, 50 μm. Hence the piston 106 is pressed downward against the force of the Belleville spring 108. However, the pressure of the pumping chamber 109 is increased, because the check valve 129 is closed.

If the ratio of the area of the piston 106 and the area of the valve 130 is 25:1, the movement (50 μm) of the piston 106 is amplified by 25 times to cause a stroke of 1.25 mm of the valve 130. However, in the downward movement of the valve 130, the stopper 133 abuts on the step 124. Hence, the stroke of the valve 130 is limited to 1 mm. The purpose of such limitation is to prevent variations in the amount of injection, since the amount of extension of the piezoelectric actuator 101 varies according to the difference between piezoelectric actuators or temperature.

Since the stroke of the valve 130 is maintained constant, the area of the opening of the valve 130 is maintained constant. Accordingly, the flow rate per unit time is also maintained constant.

It is thus possible to control correctly the amount of injection by the opening time of the valve 130.

When the voltage supplied to the piezoelectric actuator 101 becomes −200 V, the piezoelectric actuator 101 is shrunken by the force of the Belleville spring 108. Hence, the piston 106 is raised. At this moment, the check valve 129 is forced to be opened. However, the inflow of the fuel from the outside to the pumping chamber 109 is negligible because of the existence of the orifice 126. Consequently, the pressure of the pumping chamber 109 is reduced quickly to close the valve 130. After that, the pressure of the pumping chamber 109 becomes equal to the feed pressure through the check valve 129. Subsequently, the above described sequence of operations is repeated.

Figure 2:
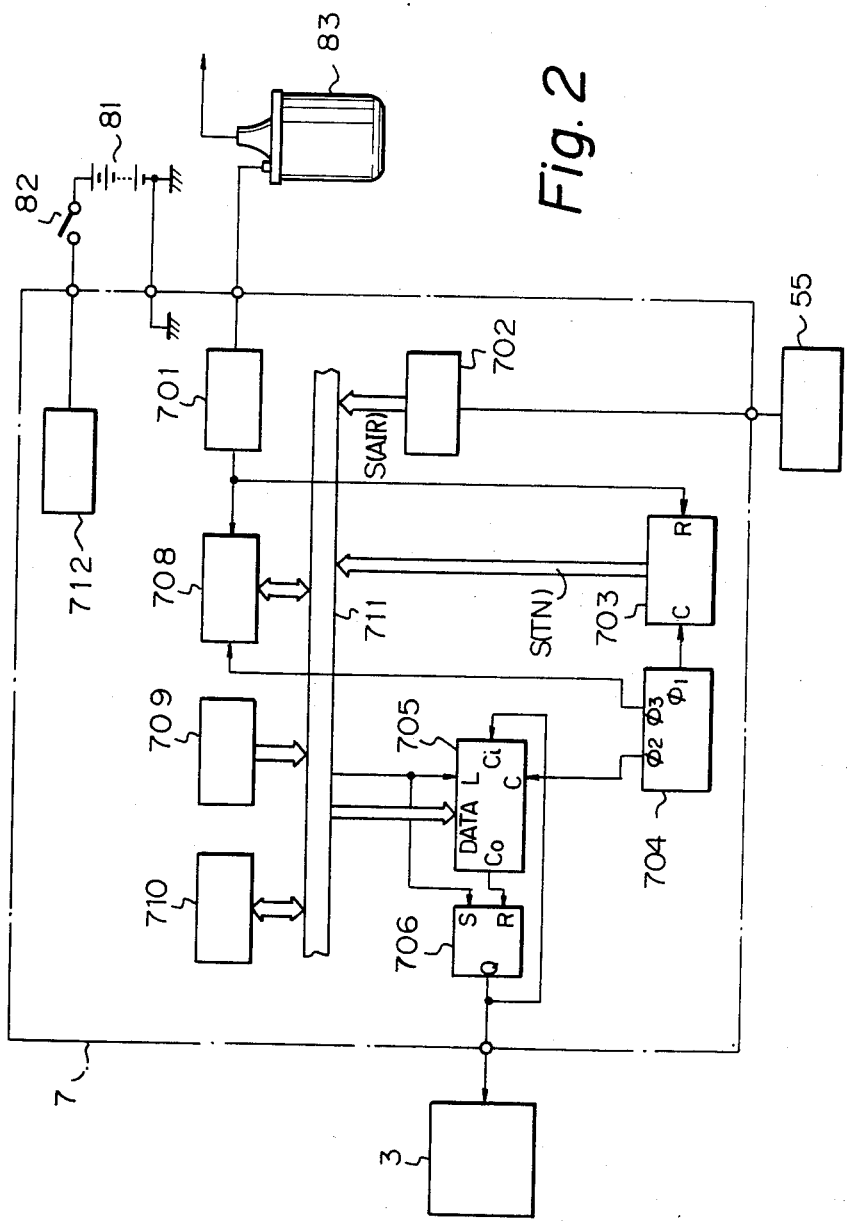
FIG. 2 illustrates the structure of the control circuit in the device of FIG. 1.

The structure and the operation of the control circuit 7 will now be described in reference to FIG. 2. A shaping circuit 701 is provided in the control circuit 1. The circuit 701 carries out waveform shaping of the signal from the negative terminal of the primary winding of the ignition coil 83 driven by an ignitor (not shown) and converts the waveform shaped signal into a digital signal. The converted signal has a frequency in synchronization with a half of the engine rotations per second.

An analog-to-digital (A/D) conversion circuit 702 of, for example, 16 bits converts the signal from the air flow measurement mechanism 55, which produces a signal proportional to the amount of the intake air, into a digital signal S(AIR) which is supplied to a bus line 711.

A 16-bit binary counter 703 receives at its resetting input terminal (R) the engine rotation signal from the shaping circuit 701 and receives at its clock input terminal (C) a clock signal $\phi_1$ of 100 KHz from a clock signal generating circuit 704. Hence, the value of the output signal of the binary counter 703 corresponds to the period of the engine rotation signal. The output signal S(TN) of the binary counter 703 is latched by the above-mentioned resetting signal and is supplied to the bus line 711.

A 16-bit presettable down-counter 705 receives at its DATA input terminal a signal from the bus line 711 to preset the signal of the fuel injection period T(INJ) calculated by a 16-bit control processor unit (CPU) 708, which will be explained later, when the potential of the load input signal at a terminal L is "1". The load input signal at the terminal L is the WRITE signal of the CPU 708.

A clock signal $\phi_2$ of 1 MHz from the clock signal generating circuit 704 is supplied to the clock input terminal of the down-counter 705. A Q output signal of an RS flip-flop circuit 706, which will be explained later, is supplied to a carry input terminal $C_i$ of the down-counter 705. The counting of the down-counter 705 is carried out only when the potential of the signal supplied to the carry input terminal $C_i$ is "1".

The carry output terminal $C_0$ of the down-counter 705 produce a signal having the potential "1" when the count of the down-counter 705 becomes 0. The produced potential "1" signal is supplied to the reset input terminal R of the RS flipflop circuit 706.

The signal from the Q output terminal of the RS flip-flop circuit 706 is supplied to the driving circuit 3 as well as to the carry input terminal $C_i$ of the down-counter 705.

One interruption input terminal INT1 of the CPU 708 is supplied with the engine rotation signal. The other interruption input terminal INT2 of the CPU 708 is supplied with a 1 KHz clock signal $\phi_3$ from the clock signal generating circuit 704. A read-only memory (ROM) 709 stores the program and data of the CPU 708. A random access memory (RAM) 710 stores the operation data for the CPU 708. A power source circuit 712 stabilizes the voltage supplied from a battery 81 through a key switch SW 82 and supplies the stabilized voltage to the elements of the control circuit 7.

The operation of the control circuit 7 will now be explained. The processing routine of the CPU 708 consists of the INT1 routine, which is started every time the engine rotation signal is supplied, and the INT2 routine, which is initiated by a clock signal $\phi_3$ of 1 KHz. The INT1 routine has priority over the INT2 routine.

In the INT2 routine, the signal of the intake air amount S(AIR) is read-in from the A/D conversion circuit 702. The read-in signal is integrated to obtain the value $\Sigma$S(AIR). The count "N" of the accumulation counter is made "N+1".

In the INT1 routine, which is started every time the engine rotation signal is supplied, the signal of the engine rotation period T is read-in from the binary counter 703, and the engine rotation rate $N_E$ is calculated from the read-in engine rotation period signal.

Next, the integrated value of the intake air amount $\Sigma$S(AIR) and the number of integration N are read-out from a memory. Based on this, the average amount of intake air during two rotations of the engine is calculated as follows:

$$Av. \{S(AIR)\} = \Sigma S(AIR)/N$$

After this calculation, each of the values $\Sigma$S(AIR) and N is made "0" in preparation for the next process.

Next, the fuel injection period T(INJ) is obtained by interpolation on the basis of a map of the fuel injection period T(INJ) versus the engine rotation rate $N_E$ and the average amount of intake air Av. {S(AIR)} which has been predetermined on the basis of the result of a bench test. After that, correction may be carried out by singals from a water temperature sensor, an $O_2$ sensor, and the like, if such sensors are provided.

The value T(INJ) is preset to the down-counter 705 with the WRITE signal. Simultaneously, the potential of the Q output signal of the RS flipflop circuit 706 becomes "1". Hence, the potential of the carry input signal for the down-counter 705 becomes "1", and, accordingly, the downcounting of the down-counter 705 is started according to the clock signal $\phi_2$.

When the number of pulses corresponding to the signal T(INJ) has been counted, the count of the down-counter 705 becomes "0", and the potential of the signal at the carry output terminal $C_i$ becomes "1". Simultaneously, the RS flip-flop circuit 706 is reset to restore the "0" potential of the output signal. The potential of the carry input signal of the down-counter 705 also becomes "0". Hence, the counting of the down-counter 705 is terminated. Thus, a signal having a potential "1" only during the period T(INJ) is produced from the output terminal of the RS flip-flop circuit 706.

The structure and operation of the driving circuit 3 will now be described with reference to FIG. 3, which illustrates the structure of the circuit, and FIG. 4, which illustrates waveforms of signals appearing in the circuit. An inductor 31 is connected in series with the piezoelectric actuator 101. A thyristor 32 for charging and a thyristor 33 for discharging are provided. The power from the battery 81 is supplied through the key switch 82 to the input terminal of a DC to DC converter 34 from which a boosted voltage 300 V is produced. The produced voltage is stored in a capacitor 35. The voltage of a battery 81 is supplied through a key switch 82 to the control circuit 7 and the driving circuit 3.

Figure 4:
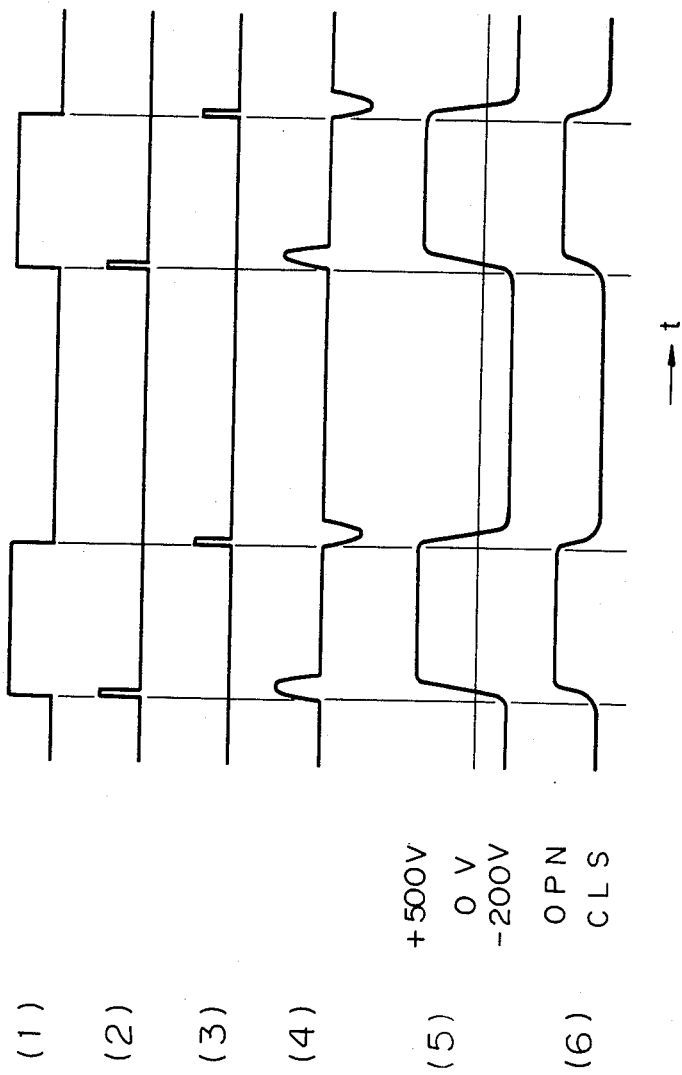
FIG. 4 illustrates the waveforms of the signals appearing in the circuit of FIG. 3.

Now, assume that a driving signal S(7) is produced from the control circuit 7 (FIG. 4, (1)). In synchronization with the rise of the driving signal S(7), a pulse of 20 $\mu$sec having "0" potential is produced from the $\overline{Q}$ output terminal of a first one-shot circuit (one-shot multivibrator circuit) 361. This pulse turns a transistor 364 ON through resistors 362 and 363 and drives a transistor 367 through resistors 365 and 366.

A pulse transformer 368 is connected to the collector of the transistor 367. When the transistor 367 becomes ON, a current flows through the primary winding of the pulse transformer 368. Hence, a voltage is induced across the secondary winding of the pulse transformer 368. A diode 369 is provided for absorbing a surge voltage. A resistor 360 is provided for preventing erroneous operation by reducing the input impedance of first and second one-shot circuits 361 and 381.

The trigger pulse produced in the secondary winding of the pulse transformer 368 is transmitted through a noise elimination circuit, consisting of a diode 370, resistors 371 and 372, and a capacitor 373, to trigger the thyristor 32 (FIG. 4, (2)).

When the thyristor 32 becomes conductive by the above-described trigger pulse, a first closed loop consisting of the capacitor 35, the thyristor 32, the inductor 31, and the piezoelectric actuator 101 formed.

Since the capacitance of the capacitor 35 is far larger than the capacitance of the piezoelectric actuator 101, the capacitor 35 can be regarded as a voltage source of 300 V. Hence, oscillation is produced in the first closed loop. Accordingly, a sinusoidal wave current flows through the first closed loop (FIG. 4, (4)).

The peak value I(PEAK) and period t of the sinusoidal wave current is determined from the capacitance C of the piezoelectric actuator 101 and the inductance L of the inductor 31. For example, the I(PEAK) is approximately 85A and t is 45 $\mu$sec when C is 2 $\mu$F and L is 100 $\mu$H.

No particular commutation circuit is needed for the thyristor 32 since the thyristor 32 turns OFF automatically when the current becomes "0". Since the voltage 500 V, which is approximately 1.5 times the source voltage, continues to be applied to the piezoelectric actuator 101 (FIG. 4, (5)), the piezoelectric actuator 101 remains in its extended state. Hence, the fuel injection nozzle remains in the open (OPN) state (FIG. 4, (6)). The operation of the fuel injection nozzle is similar to that described hereinbefore.

When the potential of the driving signal falls to "0", a pulse of 20 μsec having the potential "0" is produced at the $\bar{Q}$ output terminal of the second one-shot circuit 381. The produced pulse signal turns a transistor 384 ON through resistors 382 and 383 and drives a transistor 387 through resistors 385 and 386. A pulse transformer 388 is connected to the collector of the transistor 387. When the transistor 387 turns ON, a current flows through the primary winding of the pulse transformer 388. Hence, a voltage is induced across the secondary winding of the pulse transformer 388.

A diode 389 is provided for absorbing a surge voltage. A trigger pulse produced in the secondary winding of the pulse transformer 388 is transmitted through a noise elimination circuit, consisting of a diode 390, resistors 391 and 392, and a capacitor 393, to trigger the thyristor 33 (FIG. 4, (3)).

The thyristor 33 becomes conductive by the above-described trigger pulse. Hence, a second closed loop consisting of the piezoelectric actuator 101, the inductor 31, and the thyristor 33 is formed. Accordingly a sinusoidal wave current flows in the direction opposite to that in the former case (FIG. 4, (4)).

The peak value and the period of the current running through the second loop are similar to those of the current running through the first loop. However, the peak value of the current through the second loop is slightly less than that of the current through the first loop. This is because the energy is supplied from the power source in the case of charging, while oscillation is carried out by using the residual energy in the case of discharging.

When the sinusoidal wave current becomes "0", the thyristor 33 turns OFF automatically, and the piezoelectric actuator 101 remains in the shrunken state, since the negative voltage of approximately −200 V is stored in the piezoelectric actuator 101 (FIG. 4, (5)). Hence, the fuel injection nozzle maintains the closed (CLS) state (FIG. 4, (6)). The above described operations are repeated every time the driving signal is produced. Accordingly, opening actions and closing actions are carried out, and the injection of the necessary amount of the fuel is achieved.

The circuit structure of the device of FIG. 1 is relatively simple, because an inductive element is connected in series with a capacitive load and the direction of current is switched by utilizing the resonance between the inductive element and the capacitive load. However, the size of the device can be reduced, because the switching of high voltage and high current electric power is carried out by thyristors of a relatively low power rating. It is advantageous that a thyristor becomes OFF automatically when the current becomes "0" within a half cycle of resonance. Hence, no particular signal for controlling the period of current is needed except for the signal of a short duration trigger pulse for causing the initial conduction.

Figure 5:
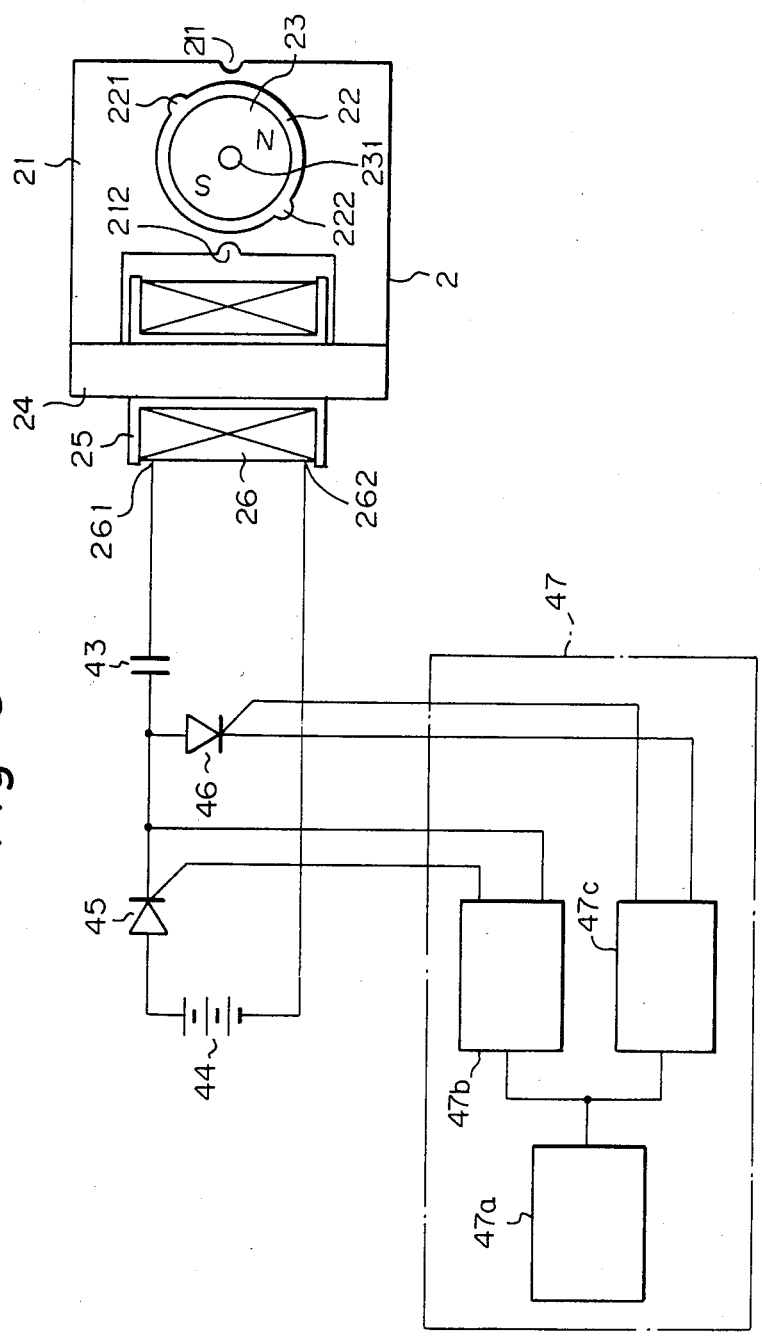
FIG. 5 illustrates a device for energizing a reactance element as a load according to another embodiment of the present invention.

A device for energizing a reactance element as a load according to another embodiment of the present invention is illustrated in FIG. 5. In the device of FIG. 5, the load reactance element is an inductive element in the form of a solenoid for a stepping motor 2.

In the stepping motor 2 of FIG. 5, a yoke 21 consists of a sheet of magnetic material or laminated sheets of magnetic material. A hole 22 for a rotor 23 is bored in the yoke 21. Recesses 221 and 222 are provided at positions 450 shifted from the direction of the magnetic path. Recesses 211 and 212 are provided in the bridge portions of the yoke 21 adjacent to the hole 22. These enlarge the magnetic reluctance of the bridge portions and, hence, facilitate the effective passage of the magnetic flux through the hole 22.

The rotor 23 is a disc made of a permanent magnet and has N and S poles. The rotor 23 is rotatable around an axis 231 of the rotor 23 supported by a bearing (not shown). A core 24 consisting of a thin sheet of magnetic material or laminated sheets of magnetic material is connected magnetically with the yoke 21, forming a closed magnetic path with the yoke 21. A coil 26 wound on a bobbin 25 is mounted on the core 24 and has terminals 261 and 262.

Figure 6:
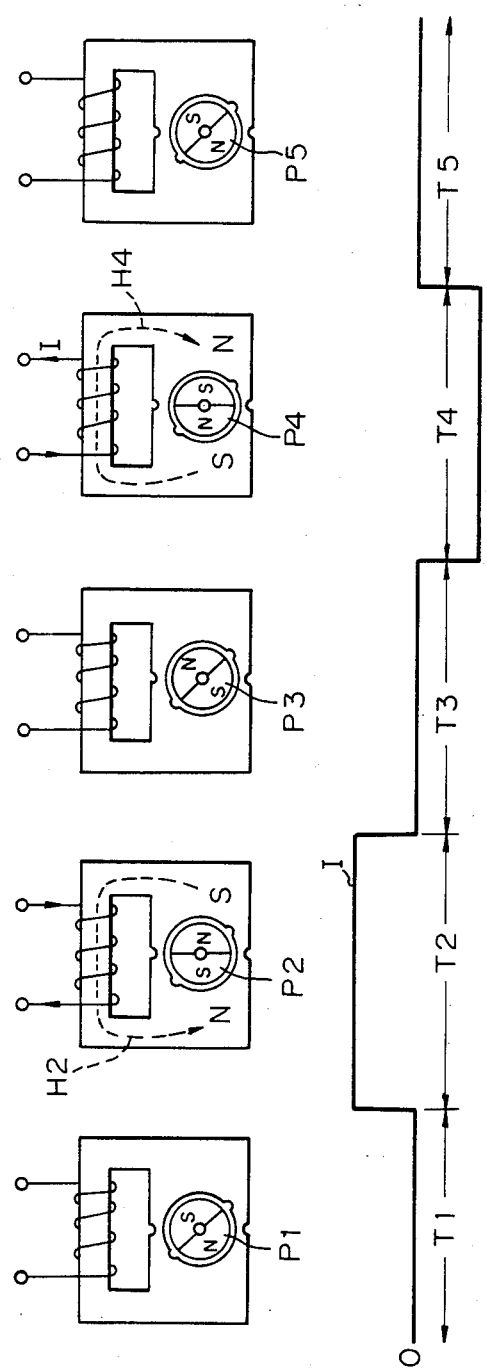
FIG. 6 illustrates the operation of the device of FIG. 5.

The operation of the stepping motor 2 of FIG. 5 will be described with reference to FIG. 6. When no current flows through the coil during the period T1, the rotor 23 is in state P1. When a current I flows through the coil during the period T2, a magnetic field H2 is formed. Hence, the rotor 23 is rotated counterclockwise to reach an equilibrium state P2. When the current is off during the period T3, the rotor 23 is in state P3.

Next, when the current I flows in the reverse direction through the coil during the period T4, a magnetic field H4 is formed. Hence the rotor 23 is rotated counterclockwise to reach another equilibrium state P4. When the current is off during the period T5, the rotor 23 is in state P5. Thus, the rotor 23 carries out a half rotation every time the direction of the current of the coil is reversed.

The stepping motor of FIG. 5 can be used for driving the hands of a clock. For example, the stepping motor rotates once every second and drives second, minute, and hour hands through rotational speed reduction mechanisms. In the power supply circuit from a DC power source 44 to the coil 26 of the stepping motor 2, a thyristor 45 for charging, a thyristor 46 for discharging, and a capacitor 43 are connected.

A control portion 47 for controlling the stepping motor is provided. In the control portion 47, a pulse generation circuit 47a for generating a signal of 1 Hz, a first trigger circuit 47b for triggering the thyristor 45 in synchronization with the rise of the timing signal of the pulse generation circuit 47a, and a second trigger circuit 47c for triggering the thyristor 46 in synchronization with the fall of the timing signal of the pulse generation circuit 47a are provided.

Figure 7:
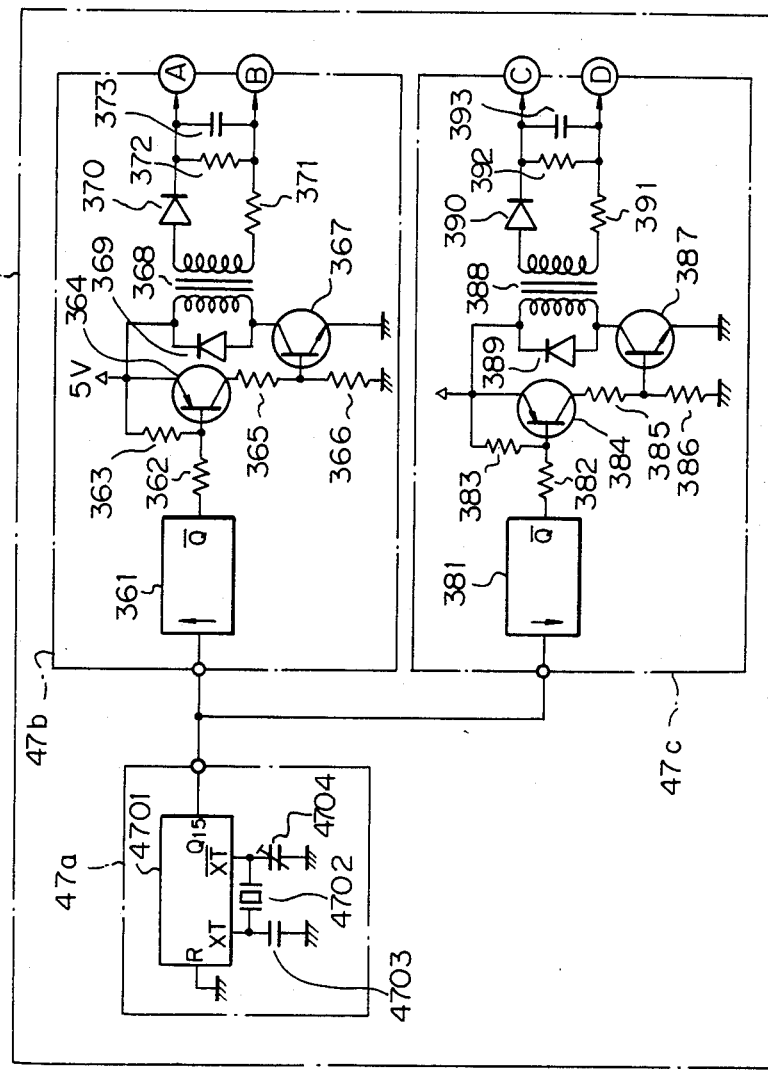
FIG. 7 illustrates the controlling portion of the device of FIG. 5.

Details of the control portion 47 will be described with reference to FIG. 7. In the pulse generation circuit 47a, a pulse generation element 4701 of, for example, TC5036P of Tokyo Shibaura Electric Co., a crystal oscillator 4702 of 32768 Hz, and capacitors 4703 and 4704 are provided. The signal of 1 Hz is produced at a $Q_{15}$ terminal of the pulse generation element 4701. This 1 Hz is a $2^{15}$ division of the original frequency 32768 Hz of the crystal oscillator 4702. The capacitance of the capacitor 4704 is variable. By varying the capacitance of the capacitor 4704, the oscillation frequency is varied slightly so that correction of leading or lagging of the clock is carried out.

The output signal of the pulse generation circuit 47a is supplied to the first trigger circuit 47b and the second trigger circuit 47c. The structures and operations of the first and second trigger circuits 47b and 47c are similar to those of the circuit of FIG. 3.

The operation of the device of FIG. 5 will now be described with reference to the waveforms of signals illustrated in FIG. 8. A timing signal is produced from the pulse generation circuit 47a (FIG. 8, (1)), and a first trigger pulse is produced from the first trigger circuit 47b in synchronization with the rise of the timing signal (FIG. 8, (2)). Hence the thyristor 45 is made conductive. Hence, a series resonance circuit consisting of the power source 44, the thyristor 45, the capacitor 43, and the coil 26 is formed. Accordingly, a sinusoidal wave current flows through the coil 26 (FIG. 8, (4)).

The peak value of the sinusoidal wave current and the period of the current flow are determined by the capacitance C of the capacitor 43 and the inductance L of the coil 26. Hence, the peak value of the sinusoidal wave current and the period of the current flow can be selected freely in accordance with the torque and the response required for the stepping motor.

Since the thyristor 45 becomes automatically OFF when the current of the coil 26 becomes "0", no particular commutation circuit is necessary. When the thyristor 45 becomes OFF, a voltage which is approximately 1.5 times the source voltage is stored in the capacitor 43. The rotation of the rotor 23 of the stepping motor is shown in FIG. 8, (6).

Figure 8:
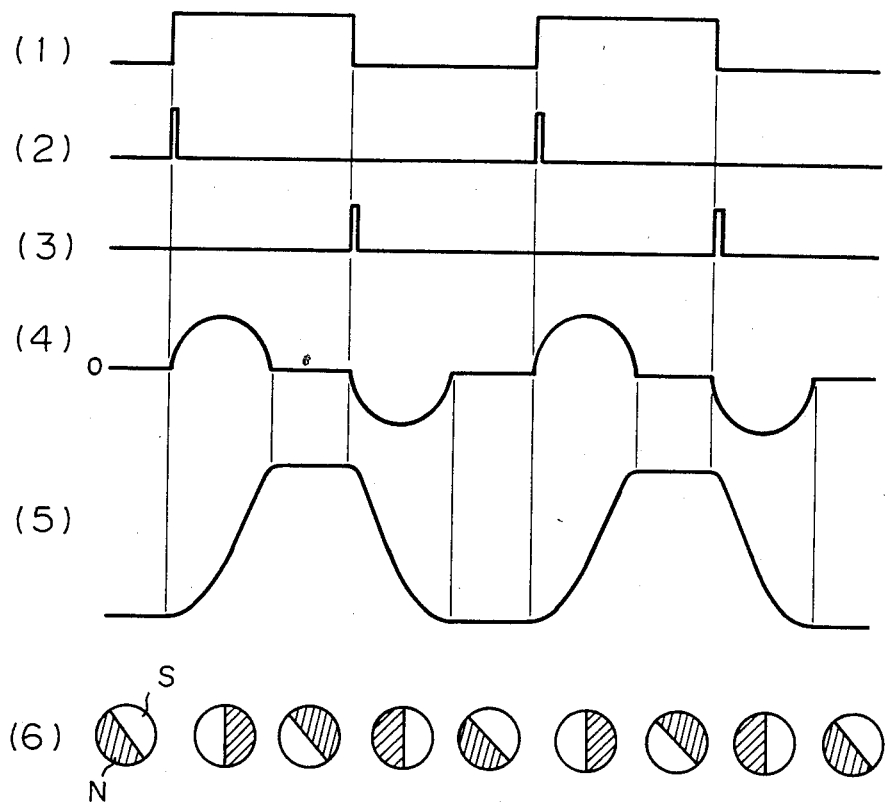
FIG. 8 illustrates the waveforms of the signals appearing in the device of FIG. 5.

Next, a second trigger pulse is produced from the second trigger circuit 47c in synchronization with the fall of the timing signal from the pulse generation circuit 47a (FIG. 8, (3)). Hence, the thyristor 46 is caused to become conductive. At this moment, a closed loop consisting of the coil 26, the capacitor 43, and the thyristor 46 is formed. Hence, a sinusoidal wave current flows in the reverse direction of the above-described case (FIG. 8, (4)).

When the current of the coil 26 becomes "0", the thyristor 46 becomes automatically OFF. At this moment, a negative voltage which is approximately equal to the source voltage is stored in the capacitor 43. The rotation of the rotor 23 is shown in FIG. 8, (6). The above described operation is repeated every time the timing signal is produced. Thus, the motion of the stepping motor is achieved.

In modified embodiments of the present invention, it is possible, for example, to use general transistors, field-effect transistors, vacuum tubes, electron discharge tubes (thyratrons), or the like in place of thyristors as the switching element.

Figure 3:
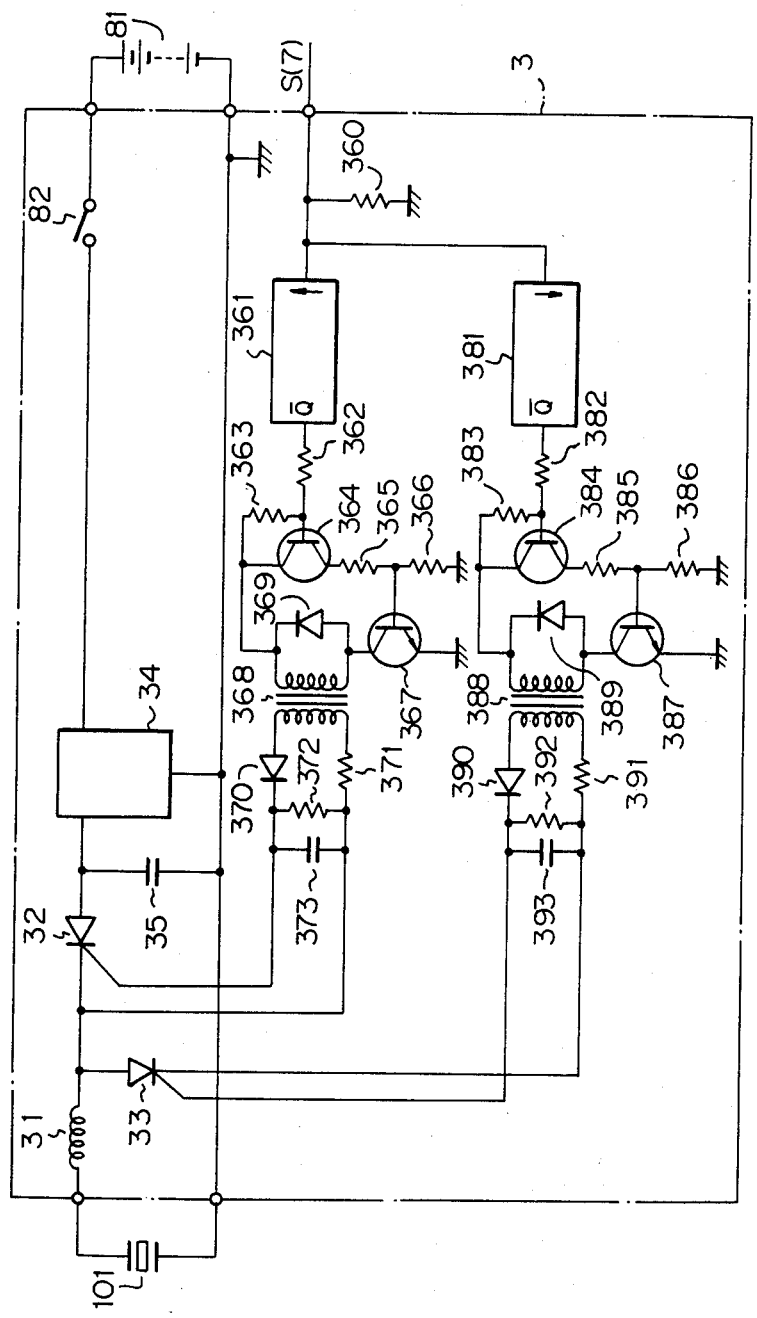
FIG. 3 illustrates the structure of the driving circuit in the device of FIG. 1.
Figure 9:
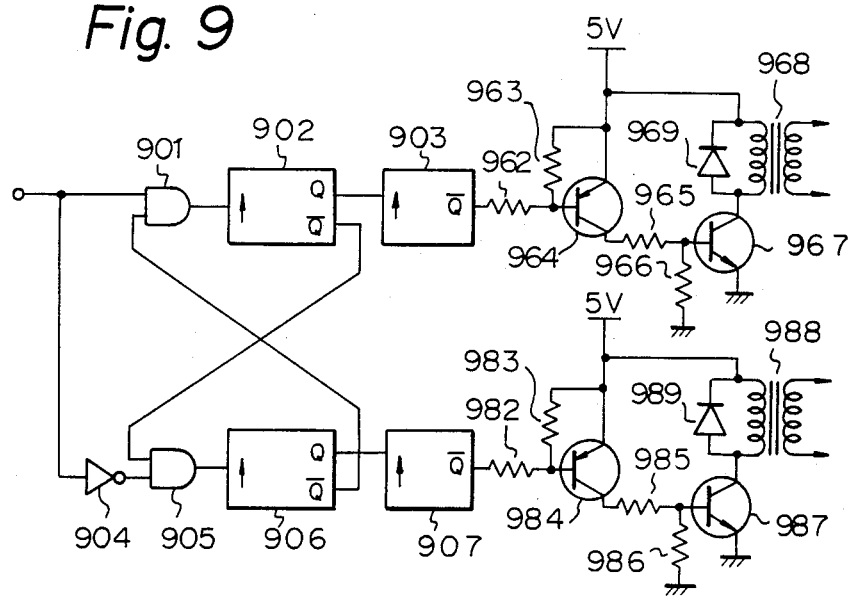
FIG. 9 illustrates another embodiment of the portion of the driving circuit of FIG. 3.

In another modified embodiment of the present invention, it is possible to adopt a thyristor controlling portion having the function of preventing erroneous operation illustrated in FIG. 9 in place of the control portion of the circuit of FIG. 3.

It should be noted that, in the circuits of FIGS. 3 and 5, it is required that the current should continue flowing during a half cycle ($t = \pi\sqrt{LC}$) of the resonance and that the switching element should be in the OFF state in another half cycle. Under such requirements, the thyristor used in the circuits of FIGS. 3 and 5 is a very desirable element having suitable characteristic. However, if the width or the interval of the driving signal is less than the above-described half cycle of resonance, both the thyristor for charging and the thyristor for discharging may simultaneously become conductive. Hence, short-circuits of the power source may occur, preventing normal operation of the circuit and leading to a breakdown of the device.

The circuit of FIG. 9 is proposed to solve this problem. The structure and operation of the circuit of FIG. 9 will now be described. A first AND gate 901 produces an output signal "1" when both the driving signal and a $\overline{Q}$ output signal of a third one-shot circuit 906 are "1". The produced output signal "1" is supplied to the trigger input terminal of a first one-shot circuit 902.

The first one-shot circuit 902 produces a pulse of a predetermined duration having a potential "1" at a Q output terminal and a pulse having a potential "0" at a $\overline{Q}$ output terminal in synchronization with the rise of the trigger input signal. The predetermined duration $t_1$ is selected to be a little longer than period t during which the sinusoidal wave current is flowing, as described concerning the circuit of FIG. 1 and the circuit of FIG. 5. The Q output signal of the first one-shot circuit 902 is supplied to the trigger input terminal of a second one-shot circuit 903, which produces a pulse of approximately 20 $\mu$sec having a potential "0" at a $\overline{Q}$ terminal in synchronization with the rise of the signal at the trigger input terminal. The produced pulse is supplied to a circuit including transistors 964 and 967, which circuit drives a pulse transformer 968 for driving a thyristor for the charging operation.

The driving signal is also supplied to an input terminal of a second AND gate 905 through an inverter 904. Another input terminal of the second AND gate 905 receives a $\overline{Q}$ output signal of the first one-shot circuit 902. The second AND gate 905 produces the output signal "1" only when the potential of the driving signal is "0" and the potential of the $\overline{Q}$ output signal of the first one-shot circuit 902 is "1".

The output signal of the AND gate 905 is supplied to the trigger input terminal of the third one-shot circuit 906, which produces a pulse of a predetermined duration having a potential "1" at the Q output terminal and a pulse having a potential "0" at the $\overline{Q}$ output terminal in synchronization with the rise of the output signal of the AND gate 905. The predetermined duration is the same as that in the first one-shot circuit 902. The Q output signal of the third one-shot circuit 906 is supplied to the trigger input terminal of a fourth one-shot circuit 907, which produces a pulse of approximately 20 $\mu$sec having a potential "0" at a $\overline{Q}$ output terminal. The produced signal is used for triggering the thyristor for the discharging operation similar to the case of the device of FIG. 1.

Figure 10:
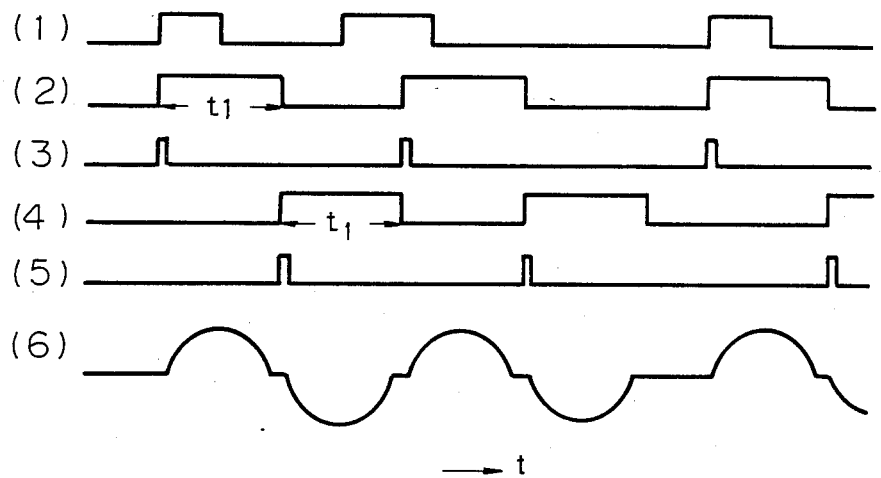
FIG. 10 illustrates the waveforms of the signals appearing in the device of FIG. 9.

The waveforms of the signals in the circuit of FIG. 9 are illustrated in FIG. 10. It is assumed that each of the duration of the driving signal having the potential "1" and the interval of the driving signal is less than $t_1$ (FIG. 10, (1)). If the assumed driving signal is applied to the driving circuit of FIG. 3 or FIG. 5, both the thyristors for the charging operation and the discharging operation will become conductive, causing an undesirable result. The circuit of FIG. 9 is effective to prevent such an undesirable operation.

In the circuit of FIG. 9, when the potential of the driving signal becomes "1", the potential of one input terminal of the first AND gate 901 becomes "1". The potential of the other input terminal of the first AND gate 901, which is the potential of the $\overline{Q}$ output terminal of the third one-shot circuit 906, is "1". Hence, the potential of the output signal of the first AND gate 901 becomes "1". Accordingly, a signal having a width $t_1$ and potential "1" is produced at the Q output terminal of the first one-shot circuit 902 in synchronization with the rise of the output signal of the first AND gate 901 (FIG. 10, (2)). In synchronization with the rise of the produced signal, the second one-shot circuit 903 is triggered to produce at the $\overline{Q}$ output terminal a signal having a potential "0" so that the thyristor for the charging operation is triggered (FIG. 10, (3)).

Next, when the potential of the driving signal becomes "0" within the period $t_1$, the driving signal is inverted by the inverter 904. Hence, the potential of one input terminal of the second AND gate 905 becomes "1". At this moment, the potential of the other input terminal of the second AND gate 905, which is the potential of the $\overline{Q}$ output terminal of the first one-shot circuit 902, remains "0". Hence, the potential of the output signal of the second AND gate 905 remains "0". Accordingly, no triggering of the third one-shot circuit 906 occurs.

When the period $t_1$ elapses, the potential of the $\overline{Q}$ output terminal of the first one-shot circuit 902 becomes "1". Hence, both of the potentials of the input terminals of the second AND gate 905 become "1". Accordingly, the second AND gate 905 produces an output signal having a potential "1".

In synchronization with the rise of the produced output signal, the third one-shot circuit 906 is triggered. Hence, a pulse having a duration $t_1$ and potential "1" is produced at the Q output terminal of the third one-shot circuit 906 (FIG. 10, (4)). In synchronization with the rise of the produced signal, a trigger signal having a potential "0" is produced from the $\overline{Q}$ terminal of the fourth one-shot circuit 907, so that the triggering of the thyristor is carried out (FIG. 10, (5)).

The potential of the $\overline{Q}$ output terminal of the third one-shot circuit 906 remains "0" within the period $t_1$ from the triggering of the third one-shot circuit, that is within the period $t_1$ from the triggering of the thyristor for discharging. Hence, under this condition, the first AND gate 901 does not produce the output signal having potential "1". Accordingly, no triggering of the thyristor for charging occurs. Thus, simultaneous occurrence of the ON states of both the thyristor for charging and the thyristor for discharging is prevented. This is useful for protecting the driving circuit from erroneous operation and breakdown and, consequently, for enhancing the reliability of operation of the device.

It is possible to adopt a circuit in which a clock signal having a predetermined frequency is counted up to a predetermined count, or a circuit in which the rising edge of the signal is differentiated and the waveform of the differentiated signal is shaped, as a modification of the above-described embodiment of FIG. 9.

Figure 11:
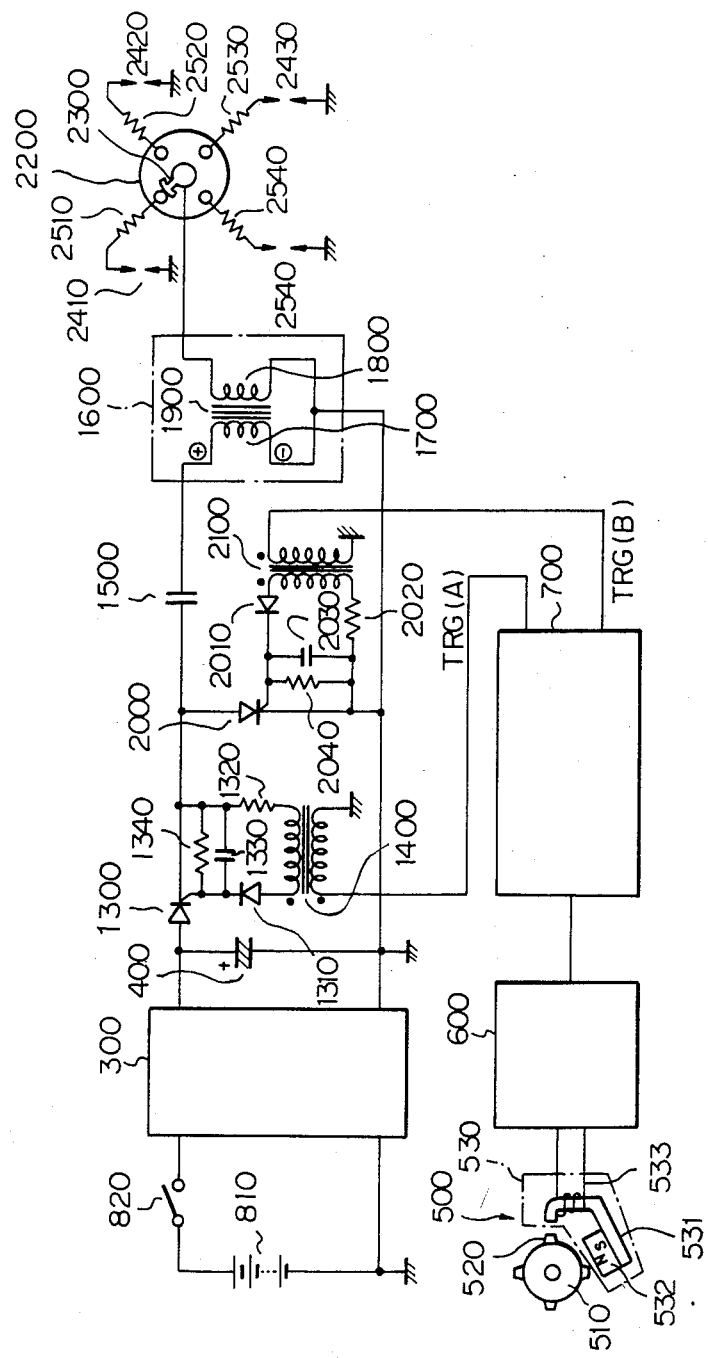
FIGS. 11, 12, and 13 illustrate another embodiment of the present invention.
Figure 12:
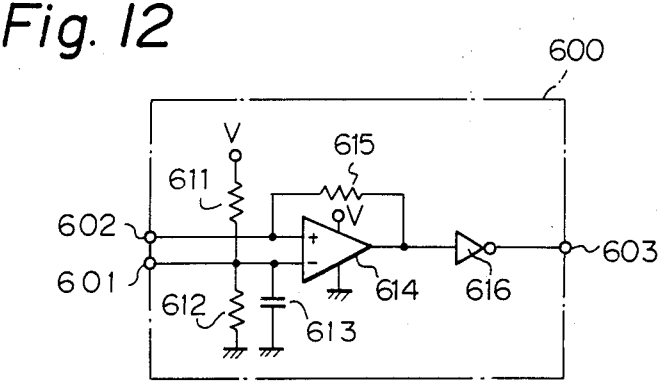
Figure 13:
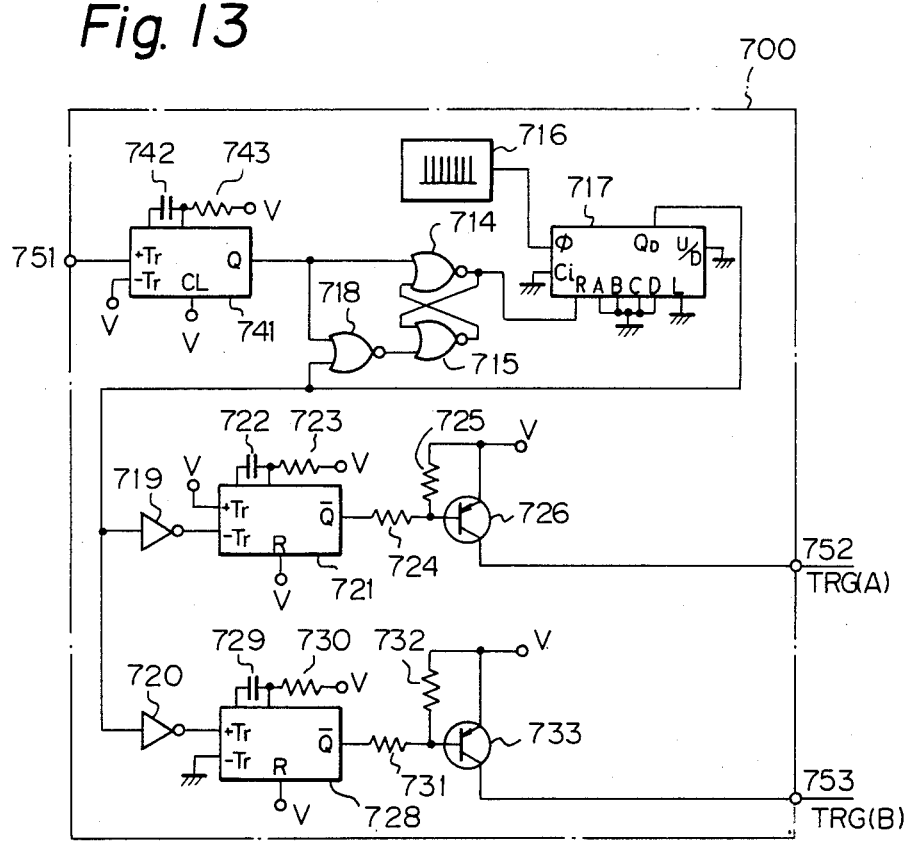

An ignition device for an internal combustion engine according to a further embodiment of the present invention is illustrated in FIG. 11. The structures of a shaping circuit and trigger signal generation circuit are illustrated in FIGS. 12 and 13. The device of FIG. 11 includes a DC power source 810 consisting of a battery, and an engine key switch 820 which is closed while the engine is running and opened while the engine is stopped.

A DC to DC converter 300, in which self-excitation oscillation of a transistor is carried out, the oscillated voltage is boosted by a transformer, and the boosted voltage is rectified to provide a DC high voltage, produces an output voltage of approximately 300 V based on the voltage of the DC power source with the voltage of, for example, 12 V. A capacitor 400 smoothes the produced output voltage of the DC to DC converter 300, stores the smoothed voltage, and supplies a transient heavy current, as described later.

An ignition timing detection unit 500 includes a signal rotor 51 which is made of magnetic material, used for detecting the ignition timing, is fixed to a distributor shaft (not shown) rotating in synchronization with a half of the rotation rate of the engine, and has projections 520, the number of which corresponds to the number of the engine cylinders. A pick-up 530, consisting of a coil 533 wound on a magnetic core 531 of magnetic material and a permanent magnet 532, is adapted to form a closed magnetic path when the projections 520 come in front of the pole of the magnetic core 531. The phase relationship between the signal rotor 51 and the pick-up 530 can be changed corresponding to the engine rotation rate or the load, although the mechanism for such is not shown in the drawings. Hence, the optimum timing for ignition is attained. A shaping circuit 600 carries out the shaping of the waveform of the output signal from the pick-up 530 to produce a signal having a potential "1" corresponding to the ignition timing.

The structure of the shaping circuit 600 is illustrated in FIG. 12. A bias voltage determined by resistors 611 and 612 and a capacitor 613 is supplied to a terminal 601 connected to one terminal of the coil 533 of the pick-up 530. This bias voltage is supplied as a reference voltage to the inverting input terminal of a comparator 614. The other terminal 602 connected to the other terminal of the coil 533 is connected to the non-inverting terminal of the comparator 614. Hence, the comparator 614 produces the output signal of potential "1" or "0" dependent on the polarity of the electromotive force of the coil 533. The positive feedback is provided from the output terminal of the comparator 614 through a resistor 615 to the non-inverting input terminal of the comparator 614. Hence, the circuit with this feedback has the function of a Schmitt trigger having a hysteresis characteristic and, accordingly, prevents the circuit from operating erroneously due to noise. The output signal of the comparator 614 is inverted by an inverter 616 to produce an output signal from a terminal 603.

A trigger signal generation circuit 700 in the device of FIG. 11 produces, based on the ignition timing signal from the shaping circuit 600, alternate trigger signals TRG(A) and TRG(B) of predetermined short durations having 180° different phases. The structure of the trigger signal generation circuit 700 is illustrated in FIG. 13. The signal from the shaping circuit 600 is supplied to the terminal 751. A one-shot circuit 741, using, for example, TC 4528 BP manufactured by Tokyo Shibaura Electric Co., is triggered by the rise of the ignition timing signal from the shaping circuit 600 and produces at a Q terminal an output signal of a duration (for example, 2 msec), predetermined by the capacitance and resistance of a capacitance 742 and a resistor 743, having a potential "1".

NOR gates 714 and 715, using, for example, TC 4001 BP manufactured by Tokyo Shibaura Electric Co., are connected to form a set-reset flip-flop circuit. When the potential of the output signal of the one-shot circuit 741 becomes "1", the potential of the output signal of the NOR gate 714 becomes "0" and the potential of the output signal of the NOR gate 715 becomes "1".

The reset terminal R of a binary presettable up-down counter 717, usining, for example, TC 4516 BP manufactured by Tokyo Shibaura Electric Co., is supplied with the output signal of the NOR gate 714. The counter 717 is started when the potential of the output signal of the NOR gate 714 becomes "0" and is reset when the above-mentioned potential becomes "1". The counter 717 is set in the down-counting mode and does not use the preset function.

A clock signal generation circuit 716 produces continuously the signal of approximately 80 KHz, which is supplied to the clock input terminal of the counter 717. A NOR gate 718, using, for example, TC 4001 BP manufactured by Tokyo Shibaura Electric Co., is provided. The output of the one-shot circuit 741 is supplied to one input terminal of the NOR gate 718, while the output signal from a $Q_D$ terminal of the counter 717, the frequency of which is division by 16 of the frequency of the input clock signal, is supplied to the other input terminal of the NOR gate 718. The potential of the output signal of the NOR gate 718 becomes "1" when both of the potentials of the input signals become "0". The output signal of the NOR gate 718 is supplied to one input terminal of the NOR gate 715 to reverse the state of the flip-flop circuit.

The output signal from the $Q_D$ output terminal of the counter 717 is supplied to inverters 719 and 720. A one-shot circuit 721, using, for example, 74LS221 manufactured by Texas Instruments Co., is triggered by the fall of the output signal of the inverter 719 and produces from a $\overline{Q}$ output terminal a signal having a potential "0" for only the duration (for example, 5 $\mu$sec) determined by the capacitance and resistance of a capacitor 722 and a resistor 723.

The produced output signal is supplied through a resistor 724 to the base of a transistor 726. The transistor 726 becomes ON when the potential of the $\overline{Q}$ output terminal of the one-shot circuit 721 is "0" and produces from the collector a signal having a potential "1", which is the signal TRG(A) obtained at a terminal 752.

A one-shot circuit 728, using, for example, 74LS221 manufactured by Texas Instruments Co., is triggered by the rise of the output signal of the inverter 720 and produces from a $\overline{Q}$ output terminal a signal having a potential "0" for only the duration (for example, 5 $\mu$sec) determined by the capacitance and resistance of a capacitor 729 and a resistor 730.

The produced signal is supplied through a resistor 731 to the base of a transistor 733. The transistor 733 becomes ON when the potential of the $\overline{Q}$ output terminal of the one-shot circuit 728 is "0" and produces from the collector a signal having a potential "1", which is the signal TRG(B) obtained at a terminal 753.

In the device of FIG. 11, the anode of a first thyristor 1300 is connected to the positive terminal of the capacitor 400, while the cathode is connected to a capacitor 1500 for resonance. The trigger signal TRG(A) is supplied, through a pulse transformer 1400 and a noise elimination circuit consisting of a diode 1310, a resistor 1320, a capacitor 1330, and a resistor 1340, to the gate of the first thyristor 1300.

The capacitor 1500 is connected to a primary winding 1700 of an ignition coil 1600. The capacitor 1500, the capacitor 400, the first thyristor 1300, the capacitor 1500, and the primary winding 1700 form a closed circuit.

The ignition coil 1600 includes the primary winding 1700, a secondary winding 1800, and a core 1900. The turn ratio between the primary and secondary windings is approximately 100 through 200. The voltage supplied to the primary winding 1700 is transformed into boosted voltage produced from the secondary winding 1800.

The anode of a second thyristor 2000 is connected to the junction of the first thyristor 1300 and the capacitor 1500, while the cathode is connected to the grounded one terminal of the primary winding 1700 of the ignition coil 1600. The second thyristor 2000, the primary winding 1700, and the capacitor 1500 form a closed circuit.

The trigger signal TRG(B) is supplied, through a pulse transformer 2100 and a noise elimination circuit consisting of a diode 2010, a resistor 2020, a capacitor 2030, and a resistor 2040, to the gate of the second thyristor 2000. One terminal of the secondary winding 1800 of the ignition coil 1900 is grounded, while the other terminal is connected to the central electrode of a distributor 2200 for distributing high voltage to each of the engine cylinders.

By the operation of a distribution rotor 2300, which rotates together with a shaft which rotates in synchronization with a half of the engine rotation rate, of the distributor 2200 of a well-known structure, high voltages are distributed through high tension conductors 2510, 2520, 2530, and 2540 to ignition gaps 2410, 2420, 2430, and 2440 arranged in the corresponding engine cylinders.

In the device of FIG. 11, the resonance circuit is formed by a capacitor 1500 and the primary winding 1700, energy is supplied to the resonance circuit by the first switching means, a portion of the energy causes the secondary winding to produce high voltage, the state of resonance is reversed by the second switching means, and, as a result, high voltage is produced from the secondary winding. High voltage is produced periodically with a predetermined duration by repeating the above-described operations. Hence, the nucleus of flame grows without extinction. Even if the discharge is interrupted by, for example, blow-out of the flame, a high voltage sufficient to initiate a new discharge is produced. Hence, the reignition is carried out. Accordingly, the ignition performance is improved remarkably.

It is possible to modify the embodiment of FIG. 11. For example, it is possible to use a transistor, an FET, a vacuum tube, a discharge tube such as a thyratron, and other switching elements in place of the thyristor. It is possible to use a photo-coupler, an acoustic coupler, and the like in place of the pulse transformer as the means for transmitting the trigger signals TRG(A) and TRG(B) to the thyristor. It is possible to transmit the trigger signal TRG(B) through a direct coupling route, since it is unnecessary to provide isolation for the trigger signal TRG(B). It is possible to use a generator which generates relatively high voltage, such as a magneto, to charge directly the capacitor 400 with the output voltage of the generator, in place of the DC to DC converter.

Figure 14:
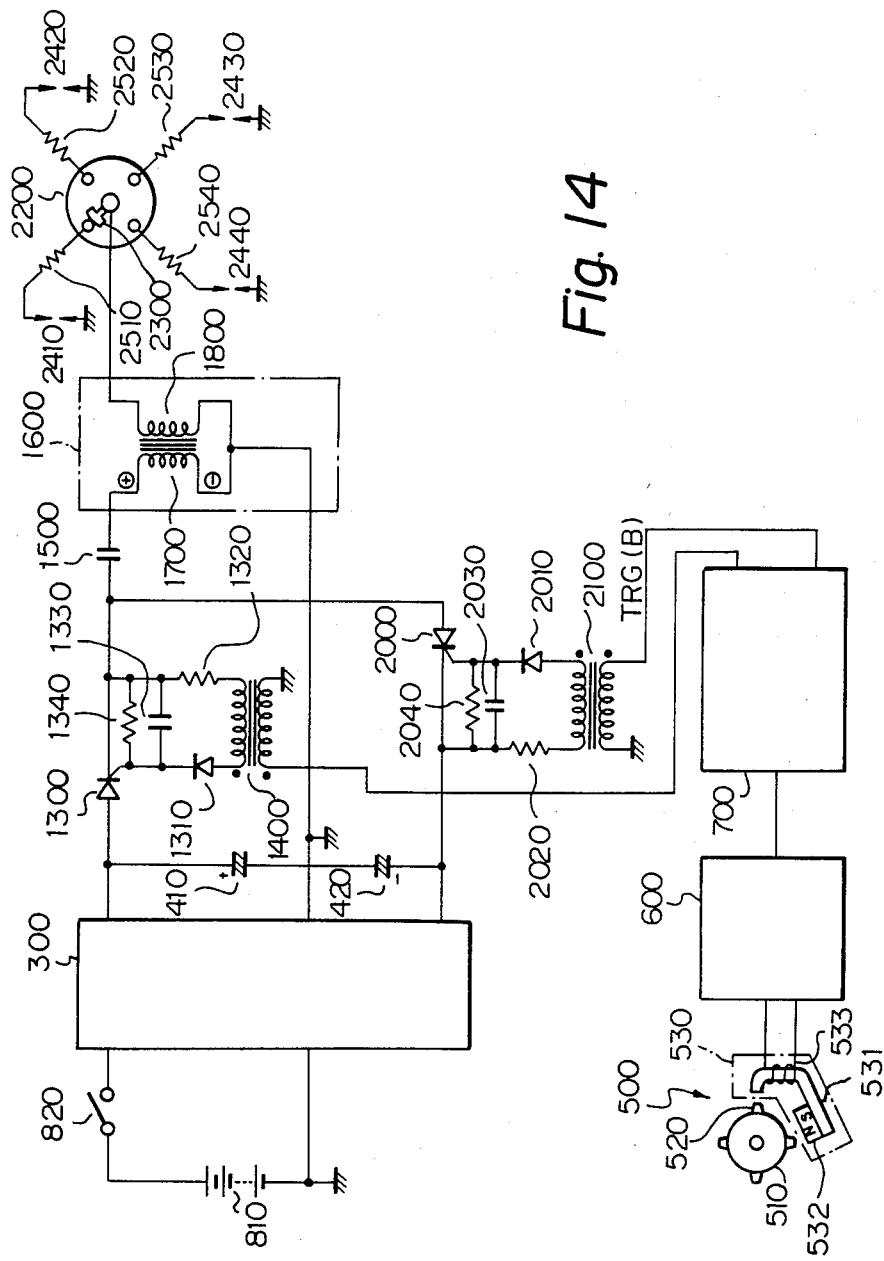
FIG. 14 illustrates a further embodiment of the present invention.

An ignition device for an internal combustion engine according to a still further embodiment of the present invention is illustrated in FIG. 14. In the device of FIG. 14, positive and negative power source circuits are provided, and a first thyristor 1300 and a second thyristor 2000 are connected as illustrated. The device of FIG. 14 achieves a similar function as in the case of the device of FIG. 11.

In the device of FIG. 14, each of the positive and negative voltages can be reduced to a half of that in the case of the device of FIG. 11. Hence, the ratio of boosting of the DC to DC converter can be reduced. Accordingly, an improvement of the efficiency of the device is attained. Further, the withstand voltage of the capacitors 410 and 420 can be reduced to a half of that in the case of the device of FIG. 11. Hence, the reduction of the size of the device can be attained. It is also possible to use a magneto in place of the DC to DC converter.

Figure 15A:
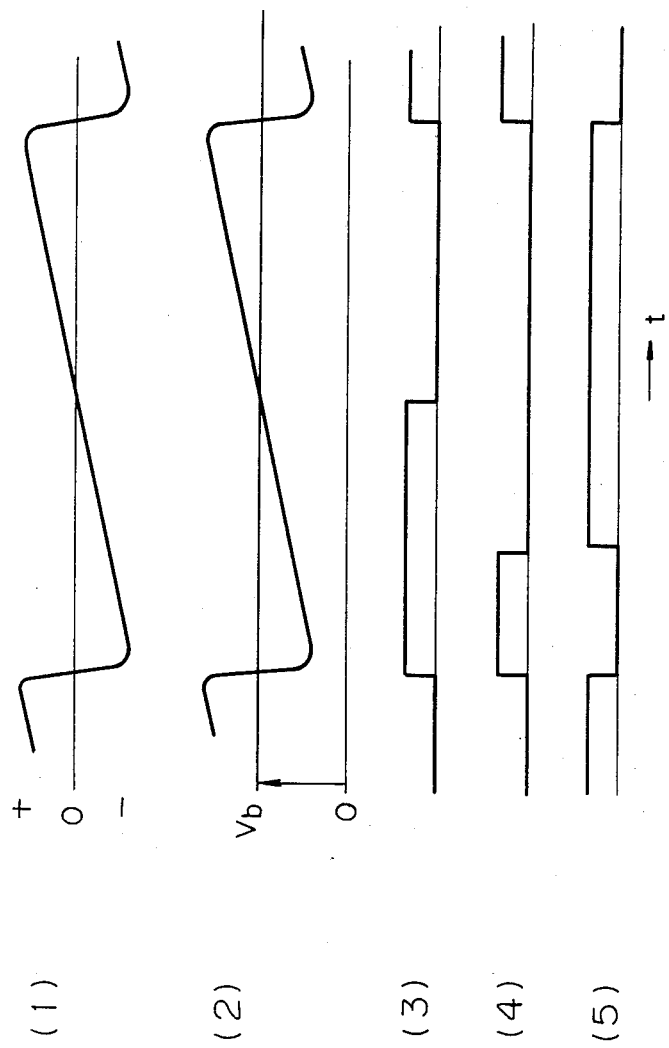
FIGS. 15A, 15B, 16A and 16B illustrate the waveforms of the signals appearing in the portions of the device of FIG. 11.
Figure 15B:
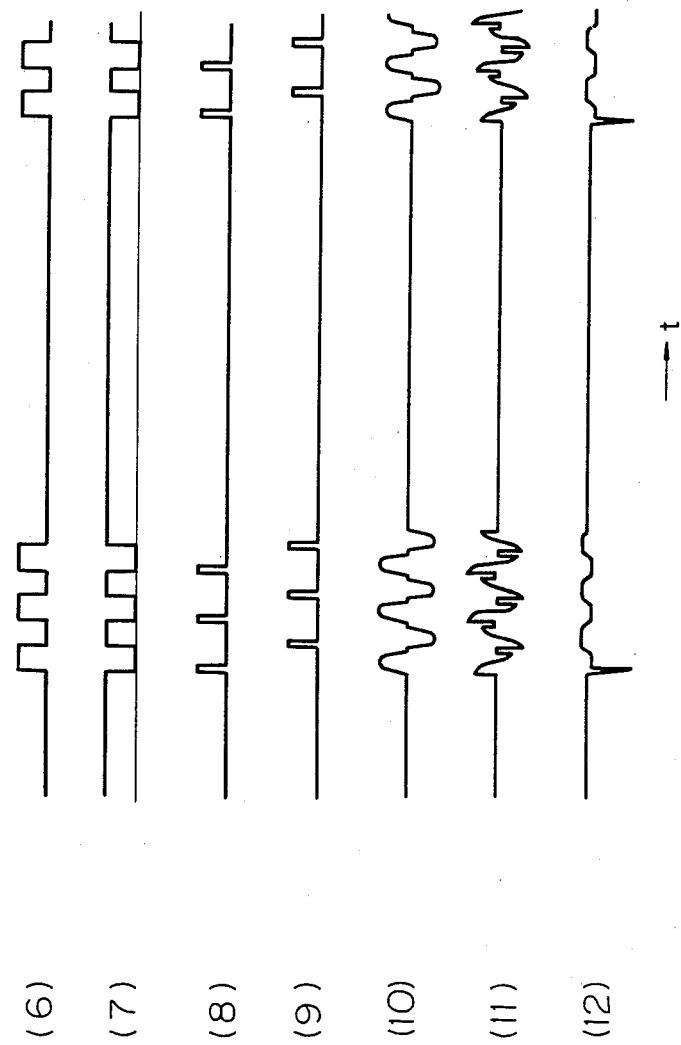
Figure 16A:
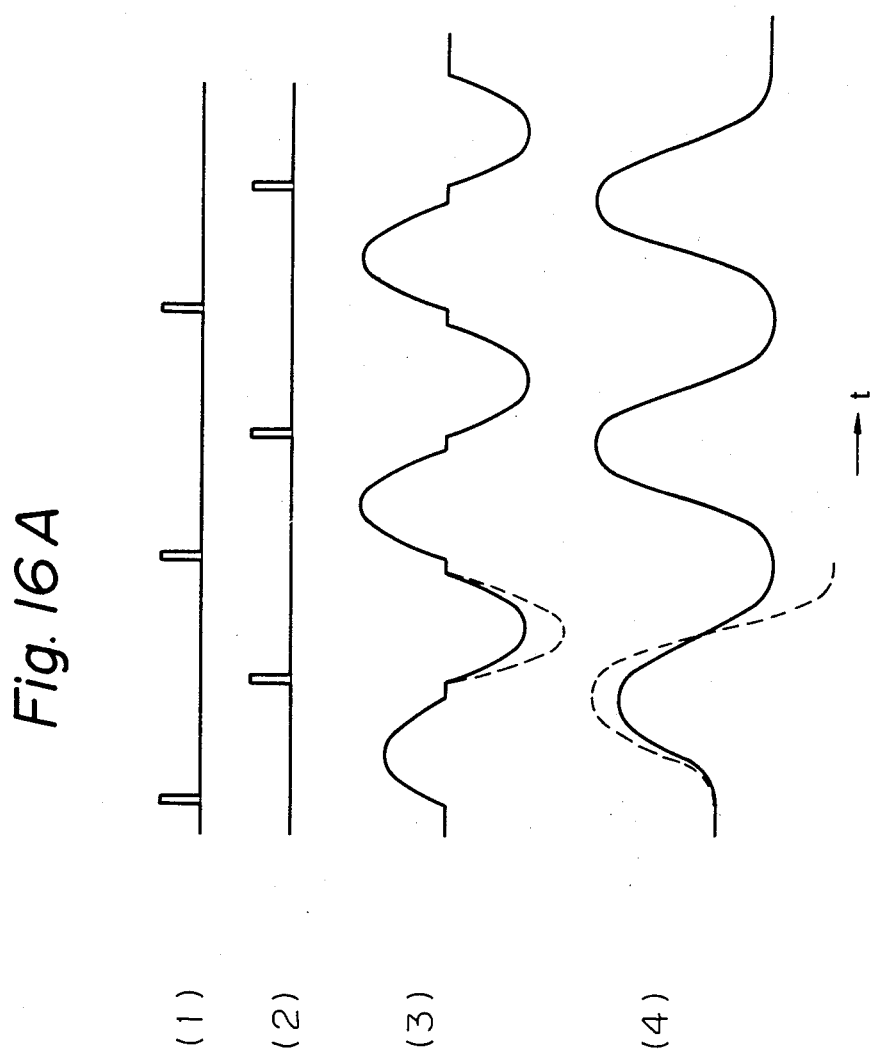
Figure 16B:
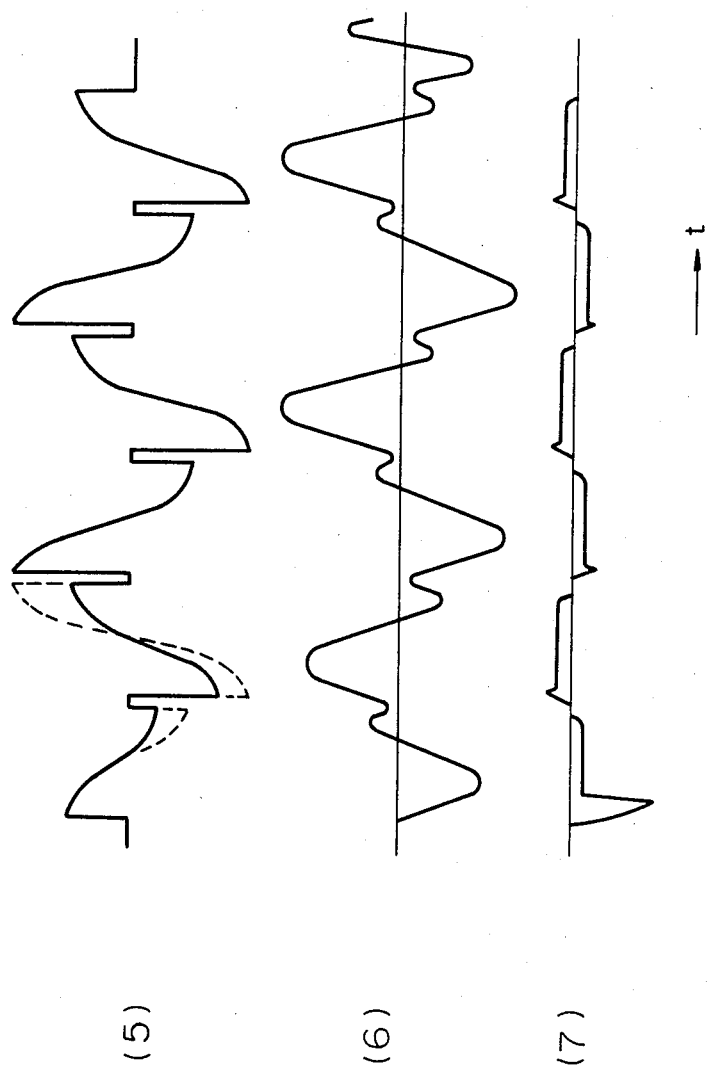

FIGS. 15 and 16 illustrate the waveforms of the signals appearing in the portions of the device of FIG. 11. In FIG. 15, the following signals are illustrated.

(1) electromotive force of the coil 533,
(2) output voltage of the pick-up 530,
(3) output signal of the shaping circuit 600,
(4) ignition duration signal,
(5) output signal of the NOR gate 714,
(6) $Q_D$ output signal of the counter 717,
(7) output signals of the inverters 719 and 720,
(8) trigger signal TRG(A) at terminal 752,
(9) trigger signal TRG(B) at terminal 753,
(10) current signal of the primary winding 1700,
(11) voltage signal of the primary winding 1700,
(12) voltage signal for the ignition plug 2410.

In FIG. 16, the following signals are illustrated. It should be noted that the time base of the abscissa of FIG. 16 is enlarged compared with that of FIG. 15.

(1) trigger signal TRG(A) at terminal 752,
(2) trigger signal TRG(B) at terminal 753,
(3) current signal of the primary winding 1700,
(4) voltage of the capacitor 1500,
(5) voltage signal of the primary winding 1700,
(6) voltage of the secondary winding 1800 in non-discharging condition,
(7) voltage of the secondary winding 1800 in discharging condition.

The operation of the device of FIG. 11 will be further described with reference to the waveforms illustrated in FIGS. 15 and 16. When the engine key switch 820 is turned ON, power is supplied from the DC power source 180 to the DC to DC converter 300, and the DC voltage of approximately 300 V is applied to and stored in the capacitor 400. The signal rotor 510 is rotated according to the rotation of the engine, and an electromotive force as shown in FIG. 15(1) is produced from the coil 533 of the pick-up 530. The ignition occurs at the turning point from the positive polarity to negative polarity of the electromotive force.

Since the potential of the coil 533 is biased by the shaping circuit 600, the voltage generated from the coil 533 has a basic value $V_b$ as the bias voltage (FIG. 15(2)). The signal generated from the coil 533 is shaped by the shaping circuit 600 to produce a signal illustrated in FIG. 15(3), the waveform of which rises to potential "1" at an ignition timing. Referring to FIG. 13, the produced signal is supplied to the trigger signal generation circuit 700, and triggers by the rise of the produced signal the one-shot circuit 741 to produce a pulse having a width of approximately 2 msec (FIG. 15(4)). The width of the produced pulse is the ignition period. The produced pulse is supplied to the NOR gate 714 and reverses the state of the flip-flop circuit consisting of the NOR gates 714 and 715 to make the potential of the output signal of the NOR gate 714 "0" (FIG. 15(5)).

The output signal of the NOR gate 714 is supplied to the reset terminal of the counter 717, and releases the reset state of the counter 717 so that the counting of the counter 717 is started with the clock frequency of approximately 80 kHz from the clock signal generation circuit 716.

The 4-bit binary counter 717 is set in the down-counting mode, and the count of the counter 717 is changed from 0 to 15 by the rise of the first clock signal. Hence, the potential of the $Q_D$ output signal of the counter 717 becomes "1". The down-counting of the counter 717 is subsequently repeated every time the clock signal is supplied. Hence, the count of the counter 717 is changed periodically in the manner: 0, 15, 14, 13, . . . , 2, 1, 0, 15, . . .

When the count of the counter 717 is 8 to 15, the potential of the $Q_D$ output signal of the counter, which is the signal of division by 16 of the input signal, becomes "1", and the counter produces a square wave signal of duty 50% having a frequency of division by 16 of the clock signal illustrated in FIG. 15(6). The width of one pulse illustrated in FIG. 15(6) is 100 µsec. The interval between the adjacent pulses illustrated in FIG. 15(6) is also 100 µsec.

Approximately 2 msec after the rise of the ignition period signal, the potential of the output signal of the NOR gate 714 becomes "0", and the potential of one input signal of the NOR gate 718 becomes "0".

If the counter 717 is immediately reset at this moment, the period of potential "1" of the preceding $Q_D$ output signal becomes short, and hence the switching of the thyristor described later cannot be carried out satisfactorily. Therefore, only when the potential of the $Q_D$ output signal is "0", the potential of the output signal of NOR gate 718 is caused to become "1", the state of the flip-flop circuit consisting of the NOR gates 714 and 175 is reversed, the potential of the output signal of the NOR gate 714 is caused to become "1", and, accordingly, the counter 717 is reset.

Thus, a plurality of the square wave signals of 5 KHz, which is the division by 16 of the clock frequency, is produced from the $Q_D$ output terminal in at least the ignition period with the delay within one cycle (12.5 µsec) of the clock signal from the ignition timing signal. The produced signal is inverted by the inverter 719 and 720 to produce the signal illustrated in FIG. 15(7). The one-shot circuit 721 is triggered by the fall of the output signal of the inverter 719 and produces a pulse of approximately 5 µsec. The produced signal causes the transistor 726 to become ON to produce a trigger signal TRG(A) illustrated in FIG. 15(8) at the terminal 752.

The one-shot circuit 728 is triggered by the rise of the output signal of the inverter 720 to produce a pulse of approximately 5 µsec. The produced signal causes the transistor 733 to become ON to produce a trigger signal TRG(B) illustrated in FIG. 15(a) at the terminal 753. Thus, the trigger signals TRG(A) and TRG(B) are the signals having the cycle time of 200 µsec, the width of 5 µsec, and the phase difference of 180°.

FIG. 16 illustrates the waveforms of FIG. 15 on an extended time base. The trigger signal TRG(A) illustrated in FIG. 16(1) triggers the first thyristor 1300 through the pulse transformer 1400 and the noise elimination circuit. The trigger signal TRG(B) illustrated in FIG. 16(2) triggers the second thyristor 2000 through the pulse transformer 2100 and the noise elimination circuit.

When the first thyristor 1300 is turned ON, a current passes through a first closed loop consisting of the capacitor 400, the first thyristor 1300, the capacitor 1500, and the primary coil 1700. Since the capacitance of the capacitor 400 is far greater than that of the capacitor 1500, the capacitor 400 can be regarded as a power source of the constant voltage of, for example, 300 V. Also, the resistance of the circuit, which is the resistance of the primary winding 1700 and the first thyristor 1300, is negligibly small. Thus, the first closed loop resonances with the condition determined by the capacitance C, for example 1 μF, of the capacitor 1500 and the inductance L, for example 1 mH, of the primary winding 1700.

The current in resonance state, which passes from the positive electrode of the capacitor 400 through the thyristor 1300, the capacitor 1500, and the primary winding 1700 to the grounded electrode of the capacitor 400, is a sinusoidal wave expressed as the following equation.

$$i = \frac{V}{\sqrt{L/C}} \sin \frac{1}{\sqrt{LC}} t \approx 9.5 \sin(3.16 \times 10^4 t) \quad (1)$$

Thus, a heavy current of approximately 9.5A as the peak value passes (FIG. 16(3)).

In order to supply such a heavy current by the DC to DC converter 300, the capacity of the DC to DC converter 300 is required to be considerably large. Since the duration of the peak state of the current is relatively short, if the charge is usually stored in the capacitor 400 and the heavy current is supplied from the capacitor 400 in case of need, the capacity of the DC to DC converter 300 can be reduced, and hence the advantageous effect of reduction of the size of the device can be attained.

The voltage applied to the capacitor 1500 is expressed as the following equation.

$$V_C = \int \frac{1}{C} i \, dt = V \left(1 - \cos \frac{1}{\sqrt{LC}} t \right) \quad (2)$$

Thus, the peak value of the voltage which is twice the source voltage V theoretically is obtained. In practice, however, the peak value of the voltage is approximately 1.5 times the source voltage, since energy consumption or energy loss may occur (FIG. 16(4)). In FIG. 16(4), the broken line represents the calculated value, while the solid line represents the actual value.

The voltage applied to the primary winding 1700 is expressed as the following equation.

$$V_L = L \frac{di}{dt} = V \cos \frac{1}{\sqrt{LC}} t \quad (3)$$

In this case also, in practice, the peak value of the voltage is approximately 1.5 times the source voltage (FIG. 16(5)). In FIG. 16(5), the broken line represents the calculated value, while the solid line represents the actual value. The first thyristor 1300 maintains the ON state only while the current i is i>0, but turns OFF when the relation changes to i≦0.

In the device of FIG. 11, the oscillatory current i expressed in equation (1) passes through the circuit containing the primary winding, the capacitor, the first thyristor, and DC power source, and hence the switching of the first thyristor 13 is carried out automatically. Accordingly, the device of FIG. 11 has an advantage that no provision of a particular switching circuit is required.

According to equation (1), the moment $t_1$ at which the current i becomes 0 is given by $t_1 = \pi\sqrt{LC} \approx 98$ μsec. At this moment, the first thyristor 1300 is turned OFF. In practice, since the first thyristor 1300 actually turns OFF when the value of the circuit current falls below the holding current value of the first thyristor 1300, which is approximately 50 to 100 mA, the value of $t_1$ is a little less than the above calculated value.

When the first thyristor 1300 becomes the OFF state, the circuit is in the "held" state during a half cycle of resonance of the circuit consisting of the capacitor 1500 and the primary winding 1700, and hence the energy supplied from the capacitor 400 is stored in the capacitor 1500. At this moment, the voltage across the terminals of the capacitor 1500 is ideally twice the source voltage V according to equation (2). However, in practice, the voltage across the terminals of the capacitor 1500 is approximately 1.5 times the source voltage V, since actually energy is lost in the circuit and, as will be described later, energy is consumed through the secondary winding 1800.

The approximate value of the energy stored in the capacitor 1500 is expressed as follows.

$$W_C = \tfrac{1}{2} C V_c^2 = \tfrac{1}{2} \times 10^{-6} \times (300 \times 1.5)^2 \approx 100 \; mj \quad (4)$$

The operation of the device when the second thyristor 2000 is triggered will now be described. The second thyristor 2000 is triggered after the first thyristor 1300 is switched and turned OFF. Hence, the first and second thyristors 1300 and 2000 are never simultaneously in the ON state and no the short-circuiting of capacitor 400 takes place.

When the second thyristor 2000 becomes the ON state, an oscillatory current passes from the upper terminal of the primary winding 1700, through the capacitor 1500 and the thyristor 2000, to the lower terminal of the primary winding 1700. The value of the current is expressed as follows.

$$i = -\frac{2V}{\sqrt{L/C}} \sin \frac{1}{\sqrt{LC}} t = -19.0 \sin(3.16 \times 10^4 t) \quad (5)$$

However, the actual value of the current is a little less than the value calculated by equation (5) (FIG. 16(3)).

The voltages of the capacitor 1500 and the primary winding 1700 are as illustrated in FIG. 16, (4) and (5). The value of the current and the peak value of the primary winding 1700 are actually approximately 1.5 times the value in the above described case of the turning ON of the first thyristor 1300.

The ON state period of the second thyristor 2000 is a little less than the period $t_1 = \pi\sqrt{LC} \approx 98$ μsec in the case of the first thyristor 1300. During the ON state period, the second thyristor 2000 is switched automatically to become the OFF state. Hence, no particular switching circuit is required.

After that, by alternately triggering the first thyristor 1300 and the second thyristor 2000, the current passes through the primary winding 1700 alternately changing in direction (FIG. 16(3)).

If it is assumed that no loss in the circuit occurs, the current of the circuit, the voltage of the capacitor 1500, and the voltage of the primary winding 1700 will be increased and the oscillation in the circuit develops divergently. In practice, however, since energy is consumed through the secondary winding 1800 and is lost in portions of the circuit, the current of the circuit, the voltage of the capacitor 1500, and the voltage of the primary winding 1700 reach their peak values after only two or three repetitions of the switchings of the first and the second thyristors.

In the above description, the secondary winding 1800 of the ignition coil 1600 has not been taken into account. The primary winding 1700 and the secondary winding 1800 are coupled in the form of a transformer. If the transforming ratio is 1:100, a voltage which is 100 times the voltage applied to the primary winding 1700 is produced from the secondary winding 1800. However, the above calculation of the secondary winding voltage is the calculation for the ideal case. In practice, the voltage produced from the secondary winding is actually approximately 70% of the value for an ideal case.

The voltage produced from the secondary winding 1800 is calculated as follows, where the source voltage is 300 V and the transforming ratio is 1:100.

$$V_2 = 300 \times 1.5 \times 100 \times 0.7 = 31.5 \, kV \quad (6)$$

The voltage $V_2 = 31.5$ kV is sufficient for the ignition by discharge. However, it should be noted that the waveform of the voltage of the primary winding includes sharp portions as illustrated in FIG. 16(5), while the waveforms of the portions of the voltage of the secondary winding corresponding to the above-mentioned sharp portions are dull ones. Also, it should be noted that no resonance takes place when the discharge occurs.

In response to the application of the voltage to the primary winding 1700 with alternate changes of the direction of the polarity, the voltage is produced in the secondary winding 1800 with the corresponding alternate changes of the direction of the polarity. The produced voltage of the secondary winding 1800 is distributed by the distributor 2200 to the cylinders, supplying the voltages through the high-tension conductors 2510, 2520, 2530, and 2540 to the ignition gaps 241, 242, 243, and 244 to ignite the discharge to the ground electrodes of the ignition gaps.

In the device of FIG. 11, it is possible to arrange the polarifies of the primary and secondary windings 1700 and 1800 so as to produce voltage in the secondary winding 1800 having a polarity opposite to that of the primary winding 1700. If so arranged, when the current of the primary winding 1700 passes downward, in FIG. 11, through the primary winding 1700, the negative high voltage is produced from the secondary winding 1800. If is desirable to apply the negative high voltage to the central electrode of a usual ignition plug. This is because less voltage is required for discharge than in the case of the application of the positive high voltage, and hence the occurrence of misfiring is suppressed. Further, the delay time of the discharge is reduced.

When a discharge path is once formed, the air in the vicinity of the discharge path is ionized, and arc discharge is started, so that the inductive discharge is maintained until the voltage falls below the discharge sustaining voltage of approximately 500 V through 1 kV (FIG. 16(7)). The duration of the inductive discharge of approximately 80 μsec is less than that of the usual ignition device, which is approximately 2 msec. However, it is possible to sustain the discharge without interruption, since the next cycle is started immediately after the termination of the inductive discharge, enabling the easy start of re-discharge due to the residual ions present between the discharge gap. Since the duration of the inductive discharge can be selected based on the ignition period which is selected from the electrical viewpoint, it is possible to select the duration of the inductive discharge as the duration sufficient to carry out the firing.

We claim:

1. An ignition device for an internal combustion engine comprising:
   a DC power source;
   an ignition coil having a primary winding and a secondary winding;
   ignition gaps connected to said secondary winding;
   a capacitor connected in series with said primary winding;
   a first switching element comprising a thyristor and forming a closed circuit with said primary winding, said capacitor, and said DC power source;
   a second switching element comprising a thyristor and forming a closed circuit with said primary winding and said capacitor; and
   a trigger signal generation means for operating in response to a supplied ignition instruction signal and generating a conduction signal to make alternately said first and second switching elements conductive, said conduction signal having a pulse width which is shorter than a half cycle of the resonance period of the reactance load and being supplied to gate terminals of the first and second switching elements, the interval of said alternate conductions of the first and second switching elements being longer than a half cycle of the resonance period of the reactance load, said trigger signal generation means comprising:
   (a) pulse signal genration circuit for repetitively generating pulse signals while said ignition instruction signal is being generated;
   (b) a first monostable circuit connected to said pulse signal generation circuit for generating a first trigger pulse having a pulse width shorter than said repetitive pulse signal in synchronization with one of the leading and the trailing edges of said repetitive signal;
   (c) a second monostable circuit connected to said pulse signal generation circuit for generating a second trigger pulse in synchronization with the other of the leading and trailing edges of said repetitive signal;
   (d) a first and a second pulse transformer having input terminals connected to said first and second monostable circuits; and
   (e) a first and a second noise elimination circuit connected between the output terminal of said first pulse transformer and the gate of said first switching element, and between the output terminal of said second pulse transformer and the gate of said second switching element.

2. An ignition device for an internal combustion engine comprising:
   a DC power source;
   an ignition coil having a primary winding and a secondary winding;
   ignition gaps connected to said secondary winding;
   a capacitor connected in series with said primary winding;
   a first switching element comprising a thyristor and forming a closed circuit with said primary winding, said capacitor, and said DC power source;

a second switching element comprising a thyristor and forming a closed circuit with said primary winding and said capacitor; and a trigger signal generation means for operating in response to a supplied ignition instruction signal and generating a conduction signal to make alternately said first and second switching elements conductive, said conduction signal having a pulse width which is shorter than a half cycle of the resonance period of the reactance load and being supplied to gate terminals of the first and second switching elements, the interval of said alternate conductions of the first and second switching elements being longer than a half cycle of the resonance period of the reactance load, said trigger signal generation means comprising:

(a) pulse signal generation circuit for repetitively generating pulse signals while said ignition instruction signal is being generated;
(b) a first monostable circuit connected to said pulse signal generation circuit for generating a first trigger pulse having a pulse width shorter than said repetitive pulse signal in synchronization with one of the leading and the trailing edges of said repetitive signal;
(c) a second monostable circuit connected to said pulse signal generation circuit for generating a second trigger pulse in synchronization with the other of the leading and trailing edges of said repetitive signal; and
(d) a first and a second noise elimination circuit connected between the output terminal of said first monostable circuit and the gate of said first switching element, and between the output terminal of said second monostable circuit and the gate of said second switching element.

* * * * *